United States Patent
Reese

(10) Patent No.: US 12,149,108 B2
(45) Date of Patent: Nov. 19, 2024

(54) PROTECTOR USABLE TO SUPPORT ON A WALL AN ELECTRIC CHARGER FOR AN ELECTRIC VEHICLE AND TO PROTECT THE WALL FROM DAMAGE DUE TO AN ELECTRICAL CORD OF THE ELECTRIC CHARGER

(71) Applicant: EATON INTELLIGENT POWER LIMITED, Dublin (IE)

(72) Inventor: Robert J. Reese, Edwardsville, IL (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 123 days.

(21) Appl. No.: 17/553,989

(22) Filed: Dec. 17, 2021

(65) Prior Publication Data

US 2023/0198272 A1     Jun. 22, 2023

(51) Int. Cl.
*H02J 7/00* (2006.01)

(52) U.S. Cl.
CPC .................. *H02J 7/0042* (2013.01)

(58) Field of Classification Search
CPC ............................................. H02J 7/00
See application file for complete search history.

(56) References Cited

U.S. PATENT DOCUMENTS

| 2013/0020990 A1* | 1/2013 | DeBoer | B60L 53/18 320/109 |
| 2018/0013428 A1* | 1/2018 | Lark, Jr. | H02G 3/18 |

\* cited by examiner

*Primary Examiner* — Robert Grant
(74) *Attorney, Agent, or Firm* — Eckert Seamans Cherin & Mellott, LLC

(57) ABSTRACT

A shield can have situated thereon a charger to charge an electrical vehicle, the shield including a panel comprising a body portion formed of a first material and a coating apparatus that is formed of a second material different than the first material, the coating apparatus being applied to at least one of the front surface and the rear surface. The shield can protect a wall to which the charger is mounted for the charging electrical. The shield can be combined with an electrical receptacle box to form a protector.

20 Claims, 4 Drawing Sheets

PROTECTOR USABLE TO SUPPORT ON A WALL AN ELECTRIC CHARGER FOR AN ELECTRIC VEHICLE AND TO PROTECT THE WALL FROM DAMAGE DUE TO AN ELECTRICAL CORD OF THE ELECTRIC CHARGER

BACKGROUND

Field

The disclosed concept relates generally to a shield usable to protect a wall from an electrical cord of a charger that is to charge an electrical car and, more particularly, to a shield such as noted that can be combined with an electrical receptacle box for protective application of such a charger to such a wall and provide an electrical connection to the charger.

Related Art

It is known to employ and electrical charger in a garage, for instance, in order to charge an electrical vehicle. It is also known, however, that the extensive electrical cord that is provided in order to facilitate a long-distance electrical connection between a housing of the charger and the electrical vehicle can, because of its extensive length, ultimately damage a wall to which the electrical charger mounted. Thus, there is room for improvement in mounting of and electrical charger to a wall for the purpose of enabling charging of electrical vehicles while protecting the wall.

SUMMARY

These needs and others are met by embodiments of the invention, which are directed to an improved shield.

As one aspect of the disclosed and claimed concept, a shield can be generally stated as including being structured to be applied to a wall and to have situated thereon a charger having a housing, the charger further capable of working with an electrical connector that is removably situated on the housing and that is structured to be electrically connected with an electric vehicle to apply an electrical charge thereto and that includes an electrical cord that is electrically connected with the electrical connector, the shield can be generally stated as including a panel that can generally be stated as including a body portion formed of a first material and having a front surface and a rear surface, at least the rear surface being substantially planar, and the panel being structured to receive the housing thereon, the panel being structured to be mounted to the wall with the rear surface situated in an orientation substantially parallel with and facing toward the wall. The panel further can be generally stated as optionally including a coating apparatus that may be formed of a second material different than the first material, the coating apparatus being applied to at least a portion of at least one of the front surface and the rear surface.

As another aspect of the disclosed and claimed concept, a shield can be generally stated as including being structured to be applied to a wall and to have situated thereon a charger having a housing, the charger further capable of working with an electrical connector that is removably situated on the housing and that is structured to be electrically connected with an electric vehicle to apply an electrical charge thereto and that includes an electrical cord that is electrically connected with the electrical connector, the shield can be generally stated as including a panel that can be generally stated as including a body portion formed of a first material and having a front surface and a rear surface, at least the rear surface being substantially planar, and the panel being structured to receive the housing thereon, the panel being structured to be mounted to the wall with the rear surface situated in an orientation substantially parallel with and facing toward the wall, the panel having formed therein a number of holes, and the panel further general including a number of fasteners that are structured to be received through the number of holes and are structured to affix the shield to the wall.

As another aspect of the disclosed and claimed concept, a protector can be generally stated as including being structured to be applied to a wall and to have situated thereon a charger having a housing, the charger further capable of working with an electrical connector that is removably situated on the housing and that is structured to be electrically connected with an electric vehicle to apply an electrical charge thereto and that includes an electrical cord that is electrically connected with the electrical connector, the protector can be generally stated as including a receptacle box that is structured to be situated on the wall, the receptacle box being structured to provide electrical power to the charger, a shield that can be generally stated as including a panel, the panel can be generally stated as including a body portion formed of a first material and having a front surface and a rear surface, at least the rear surface being substantially planar, and the panel being structured to receive the housing thereon, the panel being structured to be mounted to the wall with the rear surface situated in an orientation substantially parallel with and facing toward the wall, and the shield further can be generally stated as including at least one of a coating apparatus that is formed of a second material different than the first material, the coating apparatus being applied to at least one of the front surface and the rear surface, and an attachment apparatus wherein the panel has formed therein a number of holes and the panel further can be generally stated in a number of fasteners that are structured to be received through the number of holes and are structured to affix the shield to the wall.

BRIEF DESCRIPTION OF THE DRAWINGS

A full understanding of the disclosed concept can be gained from the following Description when read in conjunction with the accompanying drawings in which.

DESCRIPTION

Figure 1:
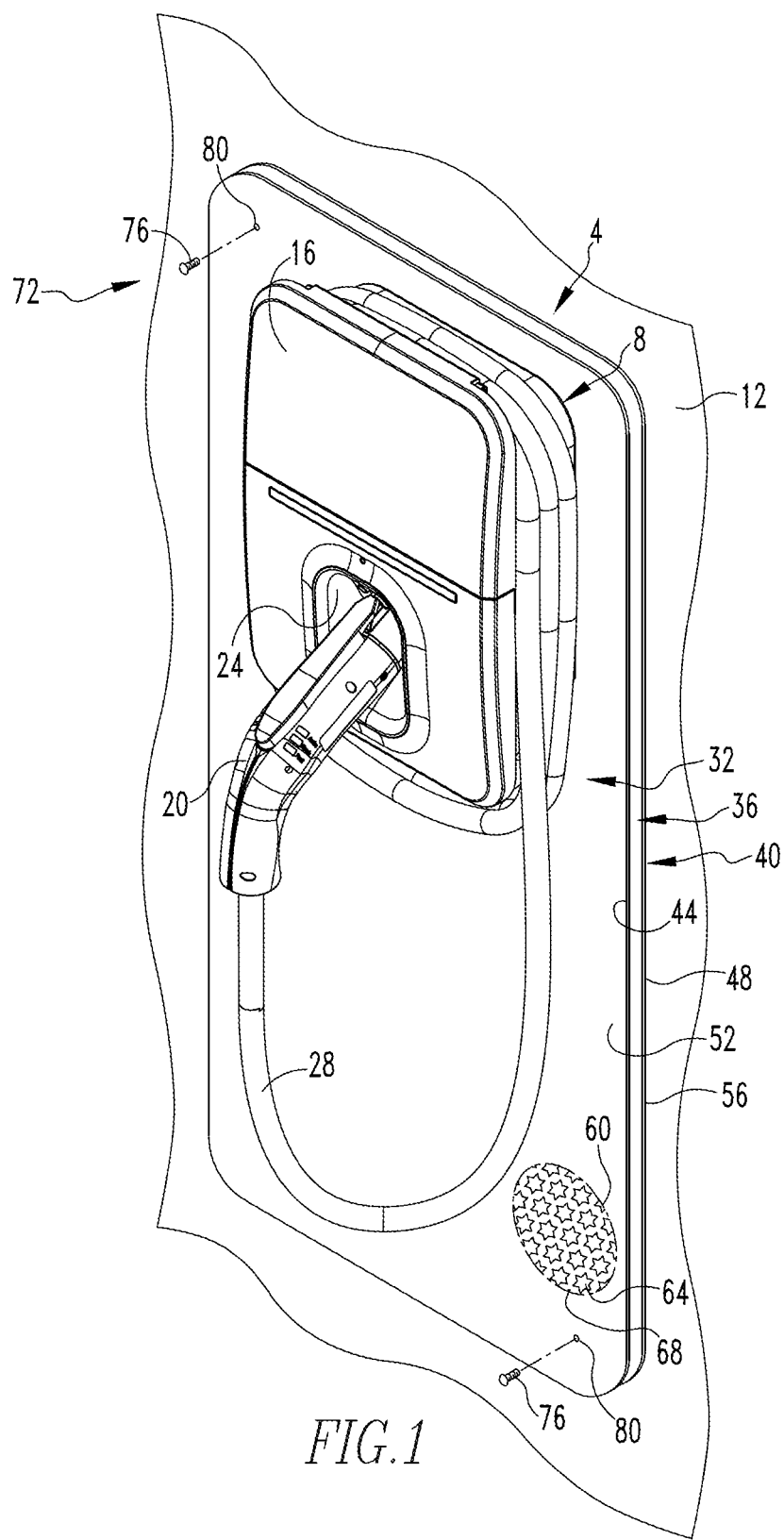
FIG. 1 is a perspective view of an improved shield in accordance with a first embodiment of the disclosed and claimed concept.

An improved shield 4 in accordance with a first embodiment of the disclosed and claimed concept is depicted generally in FIG. 1. The shield 4 is usable in the mounting of a charger 8 to a wall 12 and is advantageously provided to protect the wall 12 from use of the charger 8 and/or and electrical cord 28. As can be understood, the charger 8 includes a housing 16, and electrical connector 20 that can be situated in the receptacle 24 that is formed on the housing 16, and the aforementioned electrical cord 28 that extends between the electrical connector 20 and the housing 16. It can be understood that charger 8 receives electrical power through an electrical connection that is situated behind it and that is through the shield 4. As such, the charger 8 is directly connected with an electrical connector that is situated within the wall 12. The shield 4 receives the charger 8 thereon, but it is understood that the charger 8 could actually be physically mounted to either of the shield 4 or the wall 12 without departing from the scope of the instant disclosure or the claimed concept.

As can be understood, the electrical cord 28 is typically rather extensive in length (generally 18-25 feet) in order to make advantageous the connection between the charger 8 and an electrical vehicle. While the extensive length of the electrical cord 28 typically is desirable to facilitate use of the charger 8, the electrical cord 28 after such use typically will end up being wrapped around the housing 16 of the charger 8 and can ultimately result in discoloration or damage to the wall 12 over time. As such, the advantageous shield 4 is provided in order to provide some degree of protection between the electrical cord 28 is wall 12.

In this regard, it can be understood that the size of the shield 4 that is shown in FIG. 1 and that is shown in the other drawings may be depicted improperly small in relation to the size of the charger 8. It thus can be understood that the relative sizes of the charger 8 and of the shield 4 that are depicted in the accompanying drawings is not intended to be a limitation on the disclosure and rather is intended merely to depict the various parts of the disclosed and claimed concepts in the available document size without being intended to depict or claim the relative sizes of the various components.

The shield 4 can be generally stated as including a panel 32 that includes a body portion 36. The panel can optionally include a coating operation 40, with the coating operation 40 being situated on the at least a portion of the exterior of the body portion 36. More particularly, the body portion includes a front surface 44 and a rear surface 48 that are opposite one another. In the depicted exemplary embodiment, both the front and rear surfaces 44 and 48 are planar and are oriented parallel to one another, although it is understood that in other embodiments the front surface 44 need not necessarily be planar. The rear surface 48 is intended to be facing the wall 12. Furthermore, the panel 32 is generally of a rectangular shape and has rounded corners, although it is understood that other shapes can be employed without departing the spirit of the instant disclosure.

In the depicted exemplary embodiment, the body portion 36 is formed of a first material that can be, for example, a half inch thick PVC-based foam sheet, however other appropriate materials can be employed without departing from the spirit of the claimed concept, such as metallic sheet, wood, glass, fiberglass, and plastics of various types, by way of example. The optional coating apparatus 40, if provided, may be formed of a second material that is different than the first material. It is understood that any materials can be used to form the body portion 36 and the coating of support 40.

In the depicted exemplary embodiment, the coating apparatus 40 includes a front layer 42 that is applied to the front surface 44 and to further include a rear layer 86 that is applied to the rear surface 40. In the depicted exemplary embodiment, the front layer 52 includes a graphic content 60 that includes, for example, a first color 64 and a second color 68 that are different than one another. It is understood, however, that the graphic content 60 can include any number of colors and can include any content, such as may include active sporting participants, flower collections, or any type of artistic material without limitation.

It is also noted that the panel 32 further includes an attachment apparatus 72 that includes a number of fasteners 76 and a number of holes 80 that are formed in the panel 32 and extending through both the body portion 36 and the coating apparatus 40. As employed herein, it is understood that the expression "a number of" shall refer broadly to any non-zero quantity, including a quantity one. The number of faster 76 are intended to be received through the number of holes 80 and to be positioned in the wall 12. The number of holes 80 might be formed in advance in order to enable fasteners 76 to be received in wooden studs of the wall 12, by way of example. It is also noted, however, that the number of holes 80 might be formed by a purchaser/owner of the shield 4 and be positioned in any appropriate fashion in order to enable attachment of the shield 4 to the wall 12.

By providing shield 4 on the wall 12, use of the charger 8 results in physical application of the electrical cord 20 with the panel 32 rather wall 12 itself, which is advantageous and provides protection to the wall 12. Other advantages will be apparent.

Figure 2:
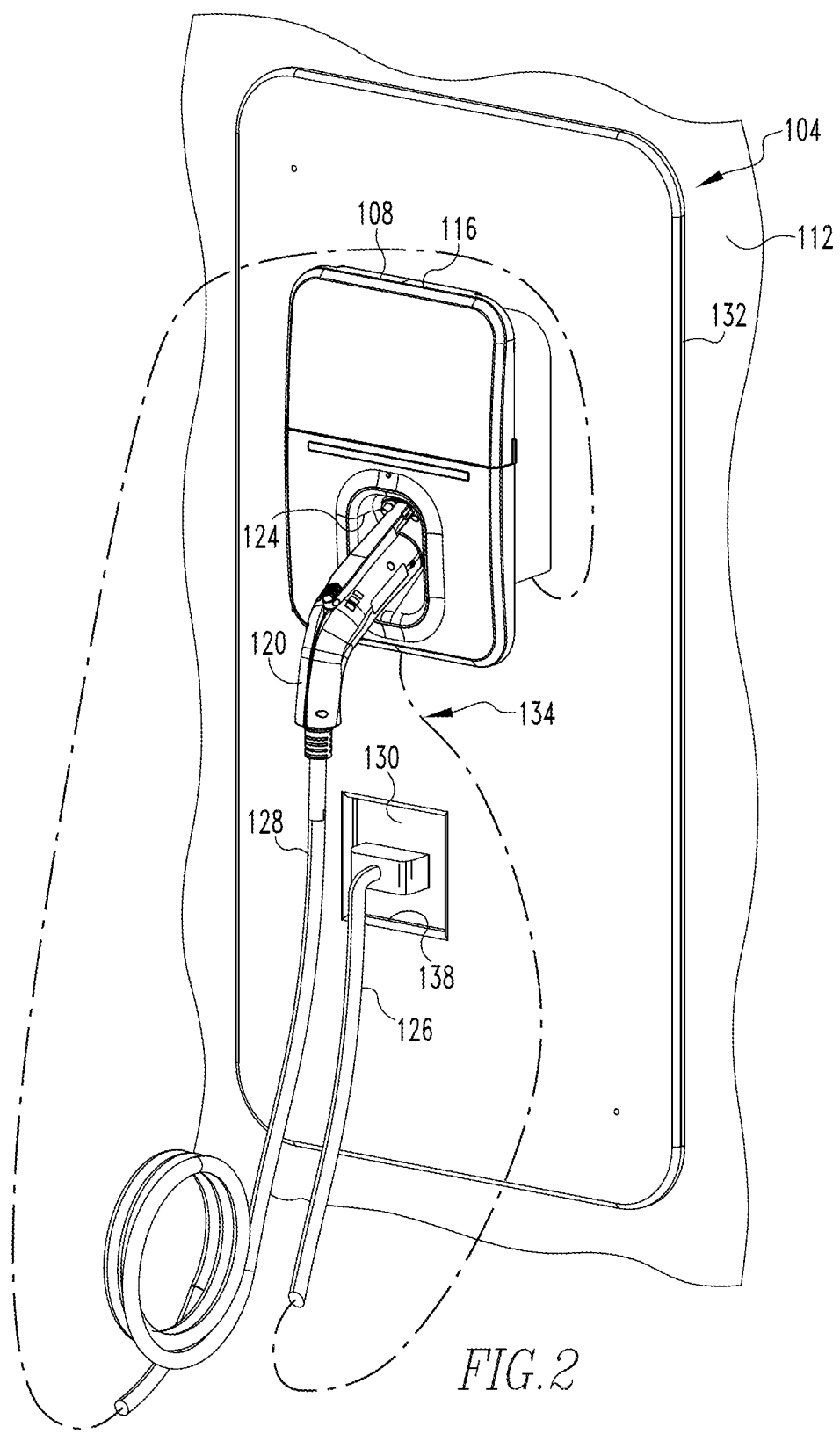
FIG. 2 is a perspective view of an improved shield and a resultant protector in accordance with a second embodiment of the disclosed and claimed concept.

An improved shield 104 in accordance with a second embodiment of the disclosed and claimed concept is depicted generally in FIG. 2. The shield 104 receives thereon a charger 108 and its affixed to a wall 112. As before, the charger 108 can be said to include a housing 116 and an electrical connector 120 that is receivable in a receptacle 124 or is otherwise situated. While the electrical connector 120 is connected with the housing 116 with an electrical cord, it is noted that the charger 108 additionally includes a supply electrical cord 126 that is electrically connected between the housing 116 and a receptacle box 130 that is electrical in nature and that is situated in the wall 112.

In the depicted exemplary embodiment, the shield 104 includes a panel 132 that is similar to the panel 32. It is noted, however, that the panel 132 has an opening 138 formed therein that can be aligned with the receptacle box 132 that has been mounted to the wall 112. In this regard, it is further understood that the shield 104 and the receptacle box 130 can together be considered to form a protector 134 that can be installed on the wall 12. It is also noted that the opening 138 can be pre-formed, but it is understood that the opening 138 could instead be positioned and formed by the installer of the shield 104 for alignment with the protector 134 as desired.

Figure 3:
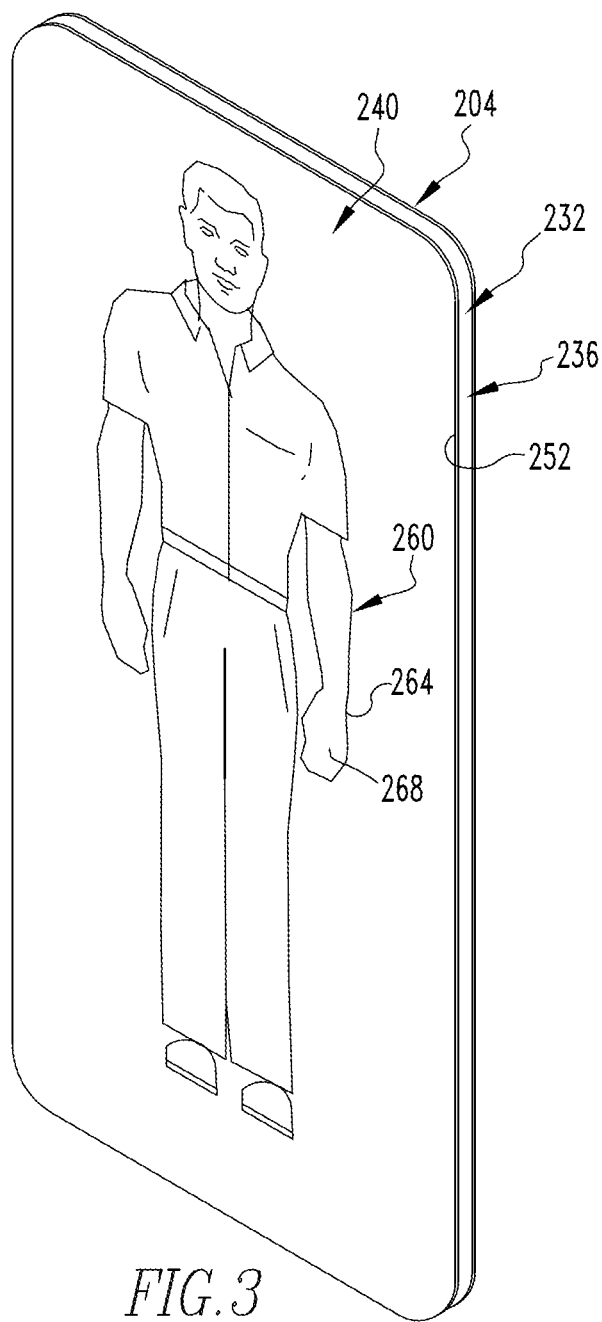
FIG. 3 is a perspective view of an improved shield in accordance with a third embodiment of the disclosed and claimed concept.

A shield 204 in accordance with a third embodiment of the disclosed and claimed concept is depicted generally in FIG. 3. The shield 204 includes a panel 232 having a body portion 236 and a coating 240. In the shield 204, the coating apparatus 240 includes a front layer 252 having a graphic content 260 that is, for example, a depiction of a person. The graphic content 260 is intended to suggest that virtually any type of content can be included in the graphic content 260, such as sporting persons, architecture, land, plants, any color of paint, any design of vinyl wrap, or virtually anything else. The exemplary graphic content 260 includes a first color 264 and a second color 268 that are different than one another, although it is understood that the graphic content 260 can include any quantity of different colors without departing from the content of the disclosed and claimed subject matter.

The shield 204 and the panel 232 are understood to have a shape that is rectangular in nature and having rounded corners. It is understood, however, that other shapes are possible.

Figure 4:
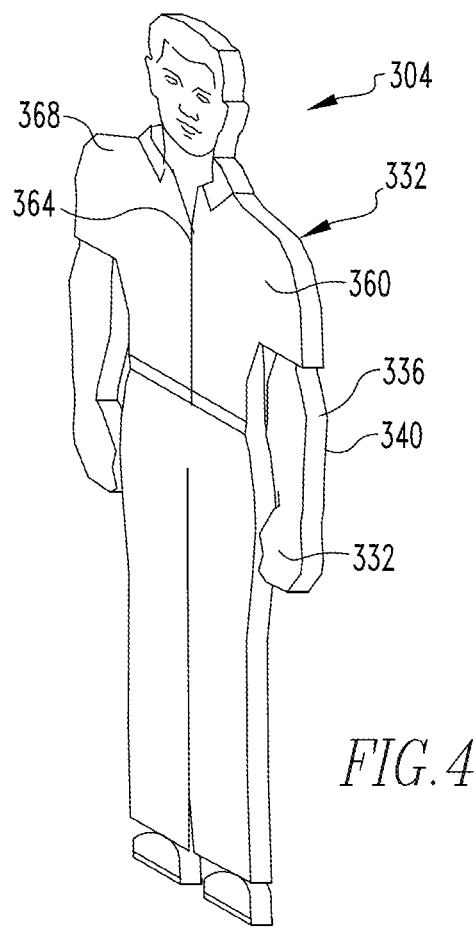
FIG. 4 is a perspective view of an improved shield in accordance with a fourth embodiment of the disclosed and claimed concept.

For example, another shield 304 is depicted generally in FIG. 4 and includes a graphic content 360 that is substantially similar to the graphic content 260. However, the shield 304 includes a panel 332 that is of a shape that is substantially the same as a perimeter of the graphic content 360 and the graphic content 260. The panel 332 again includes a body portion 336 and a coating apparatus 340, with the coating apparatus 340 including a front layer 352 on which the graphic content 360 is situated. As before, while the graphic content 360 includes a first color 364 and a second color 368 that are different than one another, the graphic content 360 can be of any graphical content and can any appropriate quantity of different colors without departing from the spirit of the disclosed and claimed concept.

Moreover, it is understood that the shield 304 and the panel 332 will be of substantially the same shape as the perimeter of whatever graphic content is provided, such as the graphic content 360 of FIG. 4, or that of any other graphic content that is provided. It is also noted that the perimeter might slightly vary from the graphic content 360 depending upon physical needs that are required. For instance, if the graphic content 360 includes a large number of protuberant items, the specific following of the exact shape of the graphic content 360 might result in numerous voids in the panel 332 which might limit the extent of protection provided by the panel 332 to the wall to which it is mounted, and it thus might be desirable to simply fill those voids with panel material.

Figure 5:
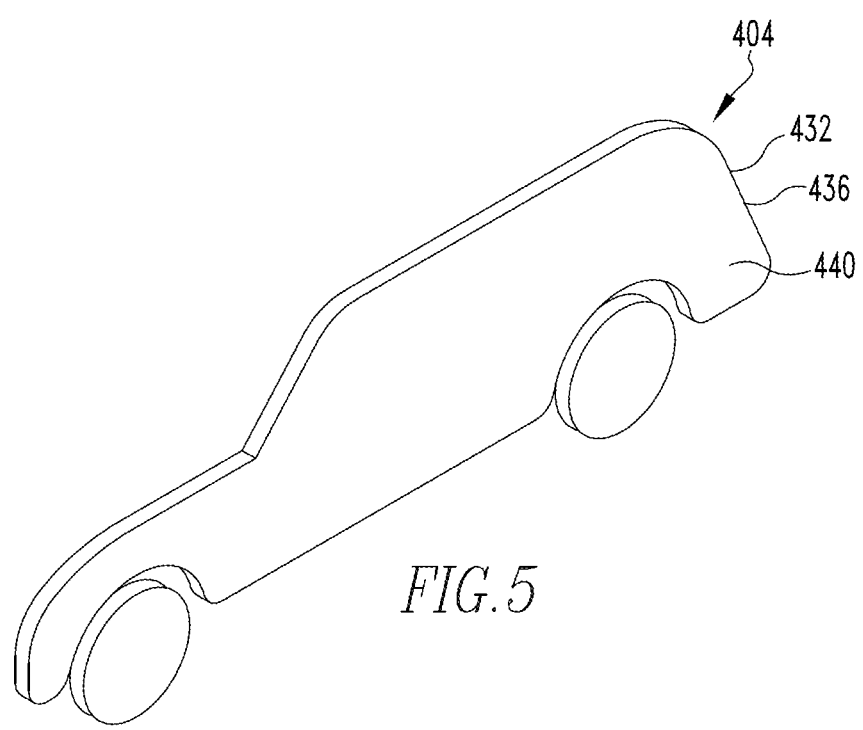
FIG. 5 is a perspective view of an improved shield in accordance with a fifth embodiment of the disclosed and claimed concept.

It is further understood that FIG. 5 depicts a fifth embodiment of the disclosed and claimed concept wherein a shield 404 again includes a panel 432 having a body portion 436 and a coating apparatus 440. It is noted, however, that the shield 404 is of a completely different shape than the shapes of the other embodiments and is intended merely to depict that any shape is possible.

It is further noted that the various shields 204, 304, and 404 do not necessarily depict the opening that may ultimately be formed therein. In this regard, it is possible that the various shields 204, 304, and 404 of various shapes potentially might be employed with a receptacle box 130 that is situated outside the perimeter of the shield 204, 304, or 404. Regardless, such shields would protect the wall upon which the shield is mounted. Other variations will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A shield that is structured to be applied to a wall and to have situated thereon a charger having a housing, the charger further capable of working with an electrical connector that is removably situated on the housing and that is structured to be electrically connected with an electric vehicle to apply an electrical charge thereto and that includes an electrical cord that is electrically connected with the electrical connector, the shield comprising:

a panel comprising a body portion formed of a first material and having a front surface and a rear surface, at least the rear surface being substantially planar, and the panel being structured to receive the housing thereon with the panel extending beyond the entire perimeter of the housing, the panel being structured to be mounted to the wall with the rear surface situated in an orientation substantially parallel with and facing toward the wall, wherein the panel is structured to prevent physical application of the electrical cord with the wall.

2. The shield of claim 1 wherein the panel further comprises a coating apparatus, the coating apparatus being applied to at least a portion of at least one of the front surface and the rear surface, and wherein the coating apparatus comprises a front layer that is applied to the front surface and comprises some graphic content that comprises at least a pair of visual colors.

3. The shield of claim 2 wherein the coating apparatus comprises a rear layer that is applied to the rear surface.

4. The shield of claim 2 wherein the coating apparatus is formed of a second material different than the first material, and wherein the graphic content comprises a visual image that is applied to the front surface.

5. The shield of claim 4 wherein the visual image has a perimeter, and wherein the panel has a shape that is substantially the same as the perimeter of the visual image.

6. The shield of claim 2 wherein the panel further comprises a number of fasteners that are structured to be received through the body portion and the coating apparatus and are structured to affix the shield to the wall.

7. The shield of claim 6 wherein the panel has formed therein a number of holes that are structured to receive therein the number of fasteners in order to affix the shield to the wall.

8. The shield of claim 1 wherein the panel has an opening formed therein which, when the panel is applied to the wall, is structured to be aligned with a receptacle box that is situated on the wall.

9. The shield of claim 1 wherein the panel has a rectangular shape having rounded corners.

10. The shield of claim 1 wherein the panel has a non-rectangular shape.

11. A shield that is structured to be applied to a wall and to have situated thereon a charger having a housing, the charger further capable of working with an electrical connector that is removably situated on the housing and that is structured to be electrically connected with an electric vehicle to apply an electrical charge thereto and that includes an electrical cord that is electrically connected with the electrical connector, the shield comprising:

a panel comprising a body portion formed of a first material and having a front surface and a rear surface, at least the rear surface being substantially planar, and the panel being structured to receive the housing thereon with the panel extending beyond the entire perimeter of the housing, the panel being structured to be mounted to the wall with the rear surface situated in an orientation substantially parallel with and facing toward the wall;

the panel having formed therein a number of holes; and the panel further comprising a number of fasteners that are structured to be received through the number of holes and are structured to affix the shield to the wall, wherein the panel is structured to prevent physical application of the electrical cord with the wall.

12. The shield of claim 11 wherein the panel has an opening formed therein which, when the panel is applied to the wall, is structured to be aligned with a receptacle box that is situated on the wall.

13. The shield of claim 11 wherein the panel has a rectangular shape having rounded corners.

14. The shield of claim 11 wherein the panel has a non-rectangular shape.

15. The shield of claim 11 wherein the panel further comprises a coating apparatus that is formed of a second material different than the first material, the coating apparatus being applied to both the front surface and the rear surface.

16. The shield of claim 15 wherein the coating apparatus comprises a front layer that is applied to the front surface and comprises some graphic content that comprises at least a pair of visual colors.

17. The shield of claim 16 wherein the graphic content comprises a visual image that is applied to the front surface.

18. The shield of claim 17 wherein the visual image has a perimeter, and wherein the panel has a shape that is substantially the same as the perimeter of the visual image.

19. A protector that is structured to be applied to a wall and to have situated thereon a charger having a housing, the charger further capable of working with an electrical connector that is removably situated on the housing and that is structured to be electrically connected with an electric vehicle to apply an electrical charge thereto and that includes an electrical cord that is electrically connected with the electrical connector, the protector comprising:

a receptacle box that is structured to be situated on the wall, the receptacle box being structured to provide electrical power to the charger;

a shield that comprises a panel, the panel comprising a body portion formed of a first material and having a front surface and a rear surface, at least the rear surface being substantially planar, and the panel being structured to receive the housing thereon with the panel extending beyond the entire perimeter of the housing, the panel being structured to be mounted to the wall with the rear surface situated in an orientation substantially parallel with and facing toward the wall; and the shield further comprising at least one of:
  a coating apparatus that is formed of a second material different than the first material, the coating apparatus being applied to at least one of the front surface and the rear surface, and
  an attachment apparatus wherein the panel has formed therein a number of holes and the panel further comprising a number of fasteners that are structured to be received through the number of holes and are structured to affix the shield to the wall, wherein the panel is structured to prevent physical application of the electrical cord with the wall.

20. The protector of claim 19 wherein the panel has an opening formed therein which, when the panel is applied to the wall, is structured to be aligned with the receptacle box that is situated on the wall.

* * * * *